US008517684B2

(12) United States Patent
Ryznic

(10) Patent No.: US 8,517,684 B2
(45) Date of Patent: Aug. 27, 2013

(54) TURBINE BLADE WITH MULTIPLE IMPINGEMENT COOLED PASSAGES

(75) Inventor: John E Ryznic, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 1407 days.

(21) Appl. No.: 12/048,521

(22) Filed: Mar. 14, 2008

(65) Prior Publication Data

US 2009/0232661 A1 Sep. 17, 2009

(51) Int. Cl.

| | |
|---|---|
| ***F01D 5/18*** | (2006.01) |
| ***F01D 5/08*** | (2006.01) |
| ***F03B 3/12*** | (2006.01) |
| ***F03D 11/02*** | (2006.01) |
| ***F04D 29/38*** | (2006.01) |

(52) U.S. Cl.
USPC .......................................... 416/92; 416/97 R

(58) Field of Classification Search
USPC ................................. 415/115; 416/97 R, 92
See application file for complete search history.

(56) References Cited

U.S. PATENT DOCUMENTS

| | | | | |
|---|---|---|---|---|
| 6,234,754 | B1 * | 5/2001 | Zelesky et al. | 416/97 R |
| 6,290,462 | B1 * | 9/2001 | Ishiguro et al. | 416/97 R |
| 6,607,356 | B2 * | 8/2003 | Manning et al. | 416/97 R |
| 7,544,044 | B1 * | 6/2009 | Liang | 416/96 R |
| 2006/0222495 | A1 * | 10/2006 | Liang | 416/97 R |
| 2006/0239820 | A1 * | 10/2006 | Kizuka et al. | 416/97 R |

* cited by examiner

*Primary Examiner* — Edward Look
*Assistant Examiner* — Su Htay
(74) *Attorney, Agent, or Firm* — John Ryznic

(57) ABSTRACT

A turbine rotor blade with a serpentine flow cooling circuit having three legs in which the first leg and the second leg are upward flowing channels each having a series of slanted ribs that define impingement chambers with impingement cooling holes to provide impingement cooling to the airfoil walls. The second leg is a downward flowing leg that contains no metering holes and is substantially unobstructed to the cooling air flow. The rotation of the blade produces a centrifugal force on the airflow passing through the channels with the metering and impingement holes to aid in the flow towards the blade tip. The return channels are unobstructed in order to minimize the pressure loss on the return channel of the serpentine circuit.

6 Claims, 1 Drawing Sheet

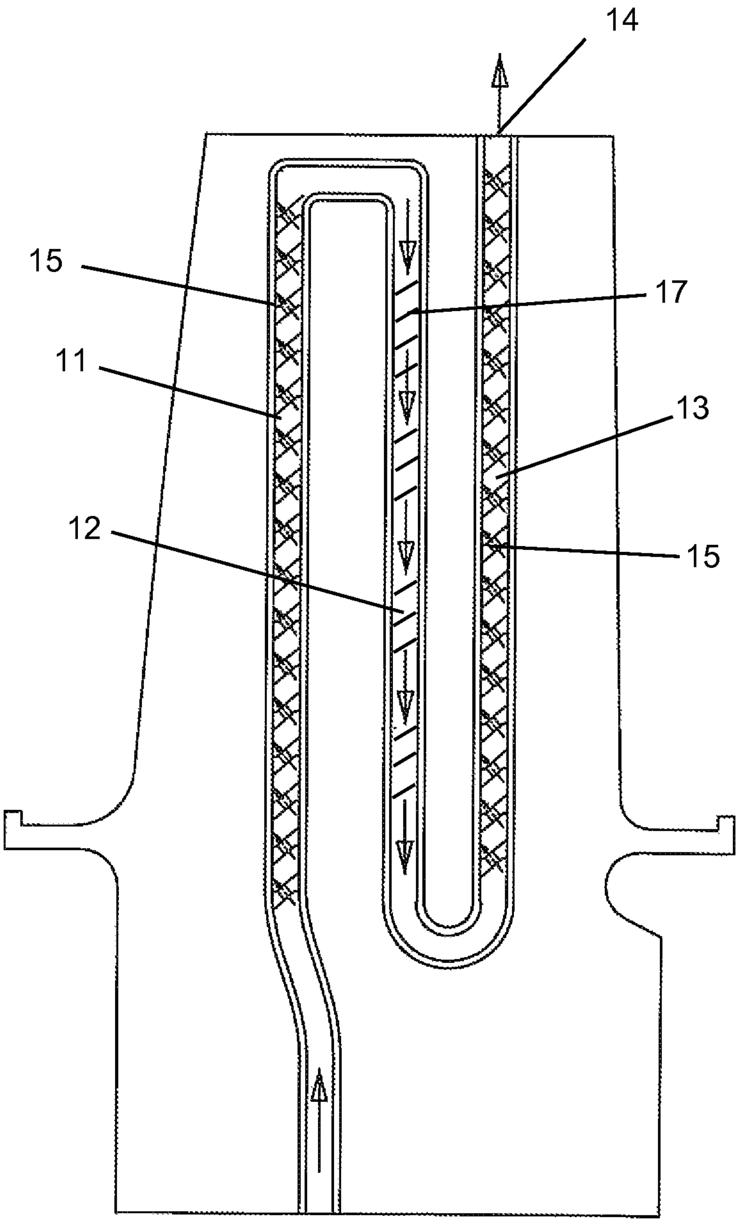
14
15
17
11
13
12
15

TURBINE BLADE WITH MULTIPLE IMPINGEMENT COOLED PASSAGES

CROSS-REFERENCE TO RELATED APPLICATIONS

This application is related to U.S. patent application Ser. No. 12/041,828 filed Mar. 4, 2008 by George Liang and entitled NEAR WALL MULTIPLE IMPINGEMENT SERPENTINE FLOW COOLED AIRFOIL, the entire disclosure of which is incorporated herein by reference.

FEDERAL RESEARCH STATEMENT

None.

FEDERAL RESEARCH STATEMENT

None.

BACKGROUND OF THE INVENTION

1. Field of the Invention

The present invention relates generally to a gas turbine engine, and more specifically to cooling of a turbine airfoil exposed to a high firing temperature.

2. Description of the Related Art Including Information Disclosed Under 37 CFR 1.97 and 1.98

In a gas turbine engine, a hot gas flow is passed through a turbine to extract mechanical energy used to drive the compressor or a bypass fan. The turbine typically includes a number of stages to gradually reduce the temperature and the pressure of the flow passing through. One way of increasing the efficiency of the engine is to increase the temperature of the gas flow entering the turbine. However, the highest temperature allowable is dependent upon the material characteristics and the cooling capabilities of the airfoils, especially the first stage stator vanes and rotor blades. Providing for higher temperature resistant materials or improved airfoil cooling will allow for higher turbine inlet temperatures.

Another way of increasing the engine efficiency is to make better use of the cooling air used that is used to cool the airfoils. A typical air cooled airfoil, such as a stator vane or a rotor blade, uses compressed air that is bled off from the compressor. Since this bleed off air is not used for power production, airfoil designers try to minimize the amount of bleed off air used for the airfoil cooling while maximizing the amount of cooling produced by the bleed off air.

In the industrial gas turbine engine (IGT), high turbine inlet temperatures are envisioned while using low cooling flows. The low cooling flows pass the compressed cooling air through the airfoils without discharging film cooling air out through the airfoil surface and into the hot gas flow or discharging a very minimal amount out through the blade tip. Thus, there is a need for an improvement in the design of low flow cooling circuits for airfoils exposed to higher gas flow temperatures.

BRIEF SUMMARY OF THE INVENTION

It is an object of the present invention to provide for an air cooled turbine blade that operates at high firing temperature and with low cooling flow.

Another object of the present invention to provide for an air cooled turbine blade in which individual impingement cooling circuits can be independently designed based on the local heat load and aerodynamic pressure loading conditions around the airfoil.

Another object of the present invention to provide for an air cooled turbine blade with multiple use of the cooling air to provide higher overall cooling effectiveness levels.

Another object of the present invention to provide for an air cooled turbine blade having a relatively thick TBC with a very effective cooling design.

Another object of the present invention to provide for an air cooled turbine blade with a suction side cooling flow circuit from the pressure side flow circuit in order to eliminate the airfoil mid-chord cooling flow mal-distribution due to mainstream pressure variation.

Another object of the present invention to provide for an air cooled turbine blade with near wall cooling that allows for well defined film cooling holes on the airfoil wall surface.

Another object of the present invention to provide for an air cooled turbine blade with in which the centrifugal forces developed by the rotation of the blade will aid in forcing the cooling air through the blade cooling passages.

A turbine blade used in a gas turbine engine, such as an industrial gas turbine engine, with a pressure side wall and a suction side wall extending between a leading edge and a trailing edge of the airfoil. The side walls include a plurality of adjacent radial extending channels in which the channels that flow form the root to the tip each have a series of impingement holes formed in angles ribs that extend in the radial direction of the channel to form a multiple impingement cooling channel along the airfoil wall, while the channels that flow from tip to root have an unobstructed passage to minimize the pressure loss to the cooling air flow. The rotation of the blade will force the cooling air through the channel having the multiple impingement cooling holes and aid in forcing the cooling air through the passages. Thus, the loss of pressure due to the cooling air passing through the multiple impingement holes can be minimized by the use of the unobstructed return passages in combination with the centrifugally forced multiple metering hole passages connected in series to form a serpentine flow cooling passage within the walls of the blade.

BRIEF DESCRIPTION OF THE SEVERAL VIEWS OF THE DRAWINGS

FIG. 1 shows a cross section side view of the multiple serpentine cooling passages in a turbine blade of the present invention.

DETAILED DESCRIPTION OF THE INVENTION

The present invention is a near wall multiple impingement serpentine flow cooling circuit used in a rotor blade of a gas turbine engine. In a large industrial gas turbine engine with a high firing temperature, airfoils such as rotor blades can have a relatively thick TBC to provide added thermal protection. With such a rotor blade having a thicker TBC, low flow cooling for the interior can be used which increases the engine performance by using less cooling air. The low flow cooling is produced by reducing or eliminating the use of film cooling on the airfoil walls by discharging a layer of film cooling air through rows of holes opening onto the airfoil wall surface on the pressure side and the suction side. The present invention makes use of radial cooling channels extending along the pressure and the suction side walls of the blade to produce near wall cooling without the use of film cooling holes. The cooling air is discharged from the passages through blade tip holes. Thus, the cooling air remains within the cooling passages to minimize the amount of cooling air used in order to provide for a low flow cooling capability. The use of the multiple metering holes in the channels having cooling flow from root to tip will significantly increase the near wall cooling capability of the cooling flow while the use of the unobstructed return passages (by unobstructed I mean without metering holes) minimizes the pressure loss in the cooling flow. Trips strips could be used in the return passages if the pressure loss is not critical. Multiple channels are used in the cooling passages to provide near wall cooling to the blade walls.

The turbine blade is shown in FIG. 1 with a 3-pass serpentine flow cooling circuit along the blade wall that includes a first leg 11 extending from the root to the tip region, a second leg 12 that functions as a return channel in which the cooling air flows from the tip region to the root, and the third leg 13 that is the same as the first leg 11 in which the cooling air flows from the root to the tip region and then discharges through the tip through one or more tip cooling holes 14. The channels 11 and 13 with the cooling flow towards the tip of the blade include multiple impingement holes 15 formed in slanted ribs that separate the impingement chambers form each other. The ribs are angled and the impingement holes are positioned in the ribs to discharge the impingement cooling air against the backside surface of the wall to produce the most effective near wall cooling of the blade pressure or suction side wall surface. The channels in FIG. 1 show the direction of impingement of the holes to be toward the left side of the blade. However, this Figure is for illustration purposes only. The impingement holes would direct the cooling air against the wall surface on which the hot gas flow is exposed.

FIG. 1 shows a single 3-pass serpentine flow cooling circuit with the multiple impingement cooling holes. In a turbine blade, several of these 3-pass serpentine flow cooling circuits can be used. The several serpentine circuits would be spaced along the side walls of the blade to provide adequate near wall cooling for the required surfaces. Each of the serpentine circuits would discharge the cooling air through the respective tip cooling holes. Also, the serpentine circuit could be aft flowing as seen in FIG. 1, forward flowing, or a combination of these two circuits. Also, 5-pass serpentine circuits could be used if the pressure loss due to passage through an extra channel having the multiple metering holes would not be too high.

In another embodiment, trip strips 17 could be used in the return channels that lack the multiple metering holes in order to improve the heat transfer coefficient in that passage without too much of a pressure loss. The rotor blade with the cooling circuit having the multiple metering impingement holes can be formed from the prior art investment casting process in which the passages with the ribs and impingement holes are formed during the blade casting process.

I claim the following:

1. A turbine blade for use in a gas turbine engine, the turbine blade comprising:

an airfoil extending from a root and platform, the airfoil having a leading edge and a trailing edge and a pressure side wall and a suction side wall extending between the two edges;

the blade including a tip section;

a serpentine flow cooling circuit to produce near wall cooling of the airfoil;

the serpentine flow cooling circuit comprising a first channel having a plurality of impingement cooling holes arranged along the channel in series, a second channel downstream from the first channel in the cooling flow direction, and a third channel downstream from the second channel in the cooling flow direction, the third channel having a plurality of impingement cooling holes arranged along the channel in series; and, the second channel being substantially unobstructed to the cooling air flow.

2. The turbine blade of claim 1, and further comprising:

the multiple metering holes are formed in slanted ribs, the slanted ribs forming impingement chambers within the channel.

3. The turbine blade of claim 2, and further comprising:

the slanted ribs and the impingement holes are arranged within the channel to discharge cooling air against the backside surface of the airfoil wall that is exposed to the hot gas flow.

4. The turbine blade of claim 1, and further comprising:

the last channel in the serpentine flow cooling circuit includes a tip region cooling hole to discharge the cooling air from the channel through the blade tip.

5. The turbine blade of claim 1, and further comprising:

the second channel includes trip strips to enhance the heat transfer coefficient.

6. The turbine blade of claim 1, and further comprising:

the channels with the metering holes flow toward the tip; and, the channel with the unobstructed flow flows toward the root.

* * * * *